(12) United States Patent
Hiraki et al.

(10) Patent No.: US 9,091,848 B2
(45) Date of Patent: Jul. 28, 2015

(54) WEARABLE DISPLAYS WITH HOLDERS THAT RETAIN DISPLAYS AT PARTICULAR POSITIONS

(71) Applicants: Nobuo Hiraki, Nagoya (JP); Narihiko Hashimoto, Nagoya (JP)

(72) Inventors: Nobuo Hiraki, Nagoya (JP); Narihiko Hashimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 101 days.

(21) Appl. No.: 13/849,450

(22) Filed: Mar. 22, 2013

(65) Prior Publication Data

US 2013/0214999 A1 Aug. 22, 2013

Related U.S. Application Data

(63) Continuation-in-part of application No. PCT/JP2012/053947, filed on Feb. 20, 2012.

(30) Foreign Application Priority Data

Feb. 24, 2011 (JP) .................................. 2011-037859

(51) Int. Cl.
*G09G 5/00* (2006.01)
*G03H 1/00* (2006.01)
*G02B 27/01* (2006.01)

(52) U.S. Cl.
CPC .......... *G02B 27/017* (2013.01); *G02B 27/0176* (2013.01); *G02B 2027/0123* (2013.01); *G02B 2027/0178* (2013.01); *G03H 1/00* (2013.01); *G09G 5/00* (2013.01)

(58) Field of Classification Search
CPC .............. G03H 1/00; G09G 3/34; G09G 5/00; G02B 27/017; G02B 27/0176; G02B 2027/0123; G02B 2027/0178
USPC .................................. 345/7–9, 84, 87; 359/13
See application file for complete search history.

(56) References Cited

U.S. PATENT DOCUMENTS 5,805,341 A 9/1998 Kuba
6,680,802 B1 * 1/2004 Ichikawa et al. .............. 359/630
(Continued)

FOREIGN PATENT DOCUMENTS

JP H09-146038 A 6/1997
JP 2000-098291 A 4/2000
(Continued)

OTHER PUBLICATIONS

Japan Patent Office, Notice of Reasons for Rejection for Patent Application No. JP 2011-037859 (counterpart Japanese patent application), mailed Sep. 3, 2013.
Japan Patent Office, International Search Report for International Application No. PCT/JP2012/053947 (counterpart to above-captioned patent application), mailed Mar. 19, 2012.

*Primary Examiner* — Lun-Yi Lao
*Assistant Examiner* — Jarurat Suteerawongsa
(74) *Attorney, Agent, or Firm* — Baker Botts L.L.P.

(57) ABSTRACT

A wearable display includes a display and a holder. The display emits light toward a light receiver. The holder retains the display in a first position relative to the light receiver when the wearable display is in an operational state. A first area of the display and a second area of the display are the only areas of the display that face the light receiver and are within a field of view of the light receiver when the display is in the first position. The first area is the only area of the first area and the second area in an overlap region when the display is in the first position. The overlap region is a portion of the field of view of the light receiver that overlaps a field of view of another light receiver. The first area is greater than the second area.

17 Claims, 4 Drawing Sheets

(56) References Cited

U.S. PATENT DOCUMENTS

| | | |
|---|---|---|
| 2008/0186586 A1 | 8/2008 | Yamamoto |
| 2010/0246022 A1 | 9/2010 | Matsumoto et al. |
| 2011/0012814 A1* | 1/2011 | Tanaka .............................. 345/8 |

FOREIGN PATENT DOCUMENTS

| | | |
|---|---|---|
| JP | 2004-061804 A | 2/2004 |
| JP | 2006-054618 A | 2/2006 |
| JP | 2010-239282 A | 10/2010 |

\* cited by examiner

SECTION TAKEN ALONG LINE A-A

WEARABLE DISPLAYS WITH HOLDERS THAT RETAIN DISPLAYS AT PARTICULAR POSITIONS

CROSS-REFERENCE TO RELATED APPLICATIONS

The present application is a continuation-in-part of International Application PCT/JP2012/053947. filed on Feb. 20, 2012. which claims the benefit of Japanese Patent Application No. 2011-037859. filed on Feb. 24, 2011. each of which is incorporated herein by reference.

BACKGROUND OF THE DISCLOSURE

1. Field of the Disclosure

The disclosure relates generally to image display systems and more specifically to wearable displays with holders that retain displays at particular positions.

2. Description of the Related Art

A known head-mountable display ("HMD") with a display is worn on the head of a user. The known HMD projects image light, which represents an image, toward an eye of a user. The known HMD enables the user to directly observe an image without a screen on which the image would otherwise be displayed.

The HMD generates the image light with light emitted from a light source using a display panel actuated in accordance with an image signal. A liquid crystal display or an organic electroluminescence ("EL") display is used for the display panel in the known HMD. Another known HMD is a see-through HMD that allows a user to see a display image displayed by the HMD superimposed on an external scene.

Each known HMD includes the display and a holder. The holder is attached to a wearable member that is worn on the head of the user, such that the holder retains the display at the head of the user. In the known HMD, the wearable member is a frame of a pair of glasses, a glasses-type special frame, or a headband.

A known holder allows the display to be hung on a frame of a pair of glasses worn by a user to retain the display at the head of the user. Another known holder is a suction cap or adhesive, which allows the display to be attached to one or each lens of a pair of glasses worn by a user.

SUMMARY OF THE DISCLOSURE

It may be necessary for the HMD to emit image light to one or each eye of the user To display an image, an HMD may emit image light to a light receiver, such as, for example, one or more eyes of a user. In such a configuration, a display of the HMD may be disposed within the user's field of vision, such that the image light may be emitted to the one or more eyes of the user. For example, in the HMD, the display may tend to be disposed closer to one or more eyes of the user. In a see-through type HMD that may permit visual identification of a combination of a display image and an environment external to the HMD (e.g., an external scene, the "real world"), an optical element, (e.g., a combiner such as a semitransparent mirror) may be disposed in front of one or more eyes of the user.

The inventors of the disclosure conducted research on the practicality of using the HMD. As a result of the research, it was found that an inappropriate placement of the display within the user's field of view may cause the user to feel discomfort and stress when the user wears the HMD on the user's head. In addition, the inventors have conducted an experiment in which the HMD is worn on the head of the user, and one or more of the location, orientation, size, shape, and color of the HMD is changed. As a result of the experiment, the inventors found that the discomfort and stress of the user while wearing the HMD may be reduced or increased based on the settings of the HMD.

In view of the above-described research, the inventors have contemplated configurations of the HMD that may reduce the discomfort and stress of a user while wearing the HMD on the user's head.

A wearable display disclosed herein may include a display and a holder. The display may be configured to emit image light toward a light receiver when the wearable display is in an operational state. The holder may be configured to retain the display in one or more positions relative to the light receiver. In particular, the holder may be configured to retain the display in a first position of the one or more positions relative to the light receiver when the wearable display is in the operational state. A first area of the display and a second area of the display may be configured to be the only areas of the display that face the light receiver and are within a field of view of the light receiver when the display is in the first position. The first area may be configured to be the only area of the first area and the second area in an overlap region when the display is in the first position. The overlap region may be a portion of the field of view of the light receiver that overlaps a field of view of another light receiver. The first area may be greater than the second area.

Other objects, features, and advantages will be apparent to persons of ordinary skill in the art from the following detailed description of the disclosure and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DERAILED DESCRIPTION OF EMBODIMENTS OF THE INVENTION

Hereinafter, exemplary configurations now are described with reference to the accompanying drawings. For the purpose of facilitating the explanation herein, an up-down direction, a right-left direction, and a front-rear direction may be used to describe a wearable display, such as, for example, an HMD 10. These directions may correspond to an up-down direction, a right-left direction, and a front-rear direction, respectively, of an object (e.g., a user) on which the HMD 10 is mounted. The up-down direction, the right-left direction, and the front-rear direction used herein may be defined with respect to the HMD 10; therefore, the presence of the user is not required for a complete understanding of the HMD 10. Consequently, the up-down direction, the right-left direction, and the front-rear direction of the HMD 10 may be defined with respect to the HMD 10 when the HMD 10 is not mounted on an object (e.g., worn on the head of the user).

Figure 1:
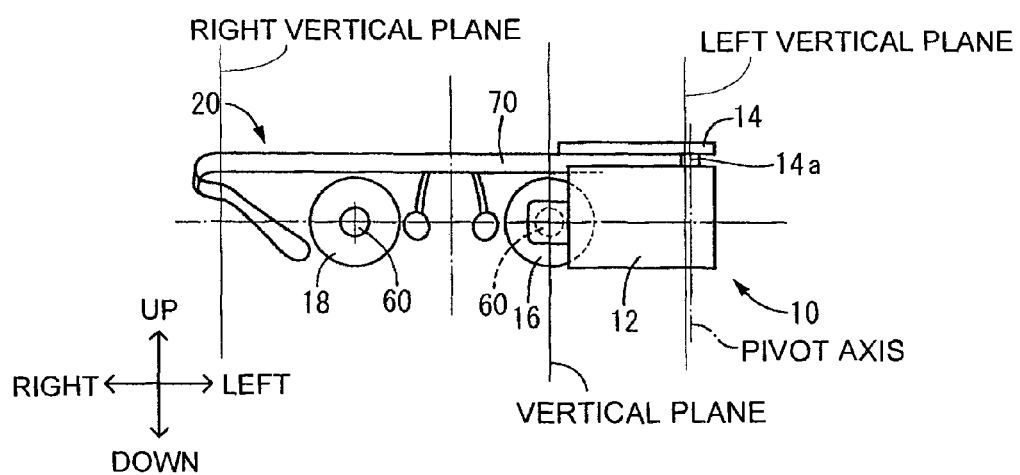
FIG. 1 is a front view showing an HMD and a frame that may enable the HMD to be held in place.

The HMD 10 depicted in FIG. 1 may be a see-through type HMD. As shown in FIG. 1, the HMD 10 may comprise a display 12 and a holder 14. The display 12 may be configured to emit image light representing an image to a light receiver, such as, for example, an observing eye 16, which may be one eye of a user. As described herein, the other eye of the user may be referred to as a non-observing eye 18.

The holder 14 may be engaged with a support member, such as, for example, a frame 20 (e.g., a wearable member). The display 12 may be attached to the holder 14 via a connector 14*a*. The holder 14 may retain the display 12 such that the display 12 may be able to pivot about a pivot axis extending in a vertical direction, as shown in FIG. 1. Consequently, the display 12 may be attached to the frame 20 via the holder 14. As shown in FIG. 1, the holder 14 may retain the display 12 on a left side of the observing eye 16. Nevertheless, the holder 14 may retain the display 12 at a position between the observing eye 16 and the non-observing eye 18 or even on the right side of the non-observing eye 18.

The frame 20 may be configured to be wearable on the head of the user. For example, the frame 20 may be worn by placing a portion of the frame 20 above one or more ears of the user. In some configurations, the frame 20 may be designed specifically for the display 12. For example, the frame 20 may have a shape similar to a typical pair of glasses that may be worn on the head of the user. Alternatively, the display 12 may be attached to a typical pair of glasses instead of the frame 20. In such configurations, the holder 14 may be adapted to the typical pair of glasses. The typical pair of glasses may comprise, for example, a pair of lenses, a bridge portion (e.g., a front portion), and a pair of temple portions. The bridge portion may connect the pair of lenses to each other in the right-left direction. The pair of lenses and the bridge may correspond to a front portion of the typical pair of glasses. The temple portions may extend rearward (e.g., into the paper in FIG. 1) from each respective end portion of the front portion in the right-left direction.

Figure 3A:
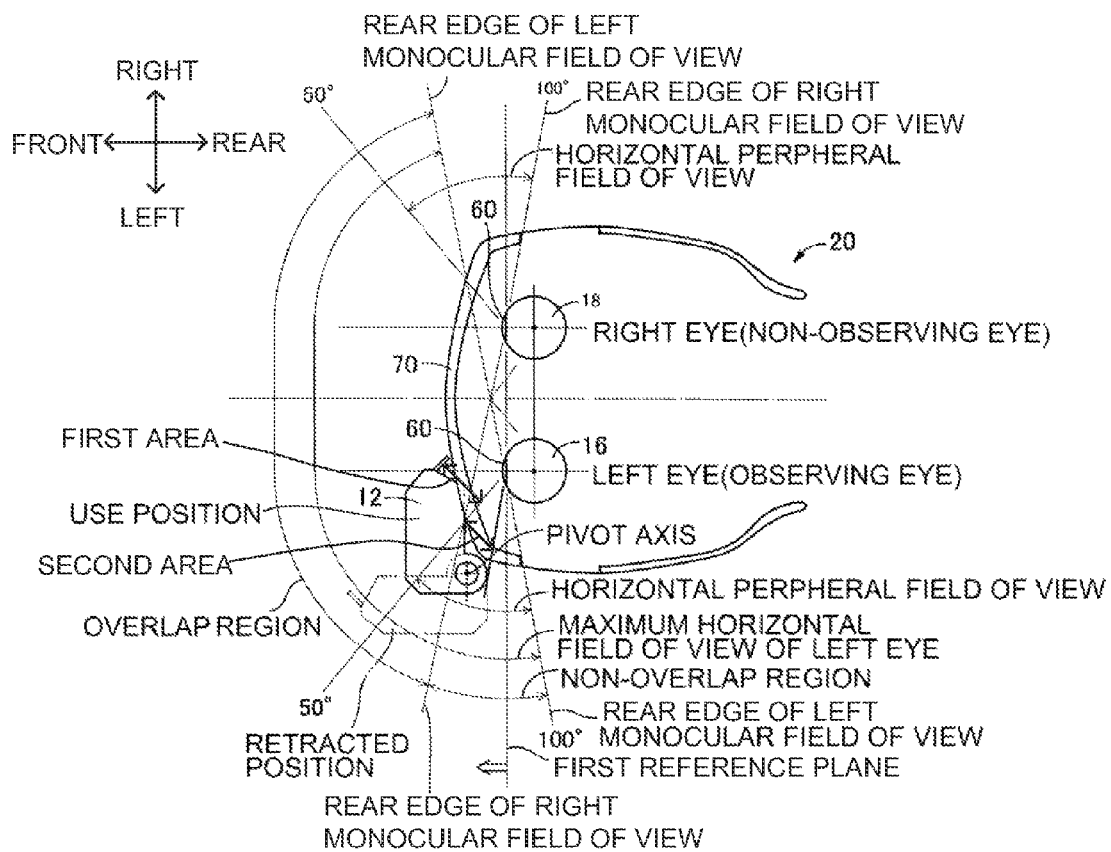
FIG. 3A is a plan view showing a use position and a retracted position of the HMD.
Figure 3B:
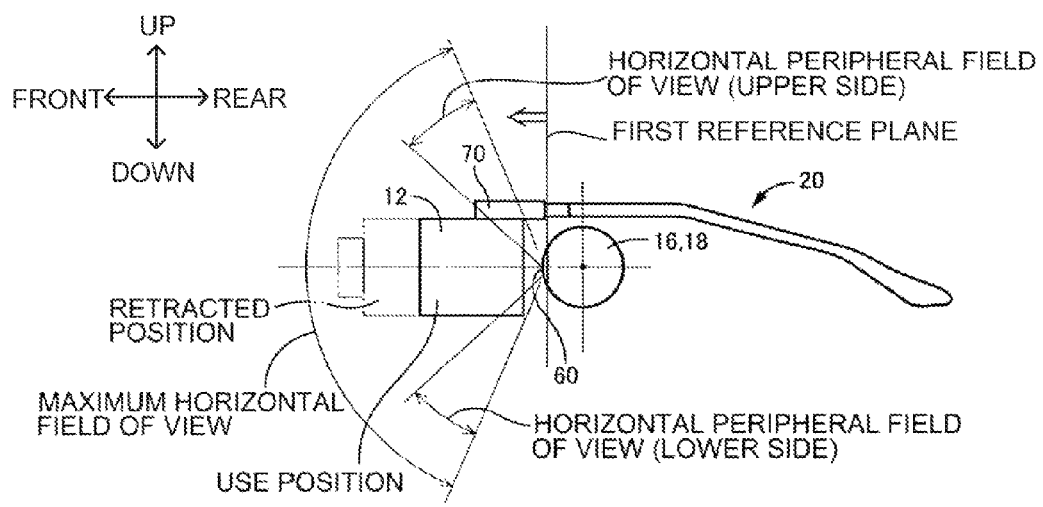
FIG. 3B is a side view showing the use position and the refracted position of the HMD.

The holder 14 may engage the display 12 with the frame 20 such that at least a portion of the display 12 may be disposed behind the frame 20 (e.g., closer to the user than the frame 20). When the frame 20 is worn by the user, for example, at least a portion of the display 12 may be moved closer to the user than the frame 20 in the front-rear direction, as shown in FIGS. 3A and 3B. For example, the holder 14 may enable the display 12 to be moved to a position closer to one of the user's eyes. This arrangement may shorten a distance between the display 12 and the user's eye (e.g., an eye relief of the display 12). Nevertheless, the user may feel discomfort and stress when the display 12 is too close to one of the user's eyes without proper consideration. Therefore, a position of the display 12 relative to the user's field of view may be determined such that discomfort and stress of the user caused by the display 12 may be reduced.

Figure 2A:
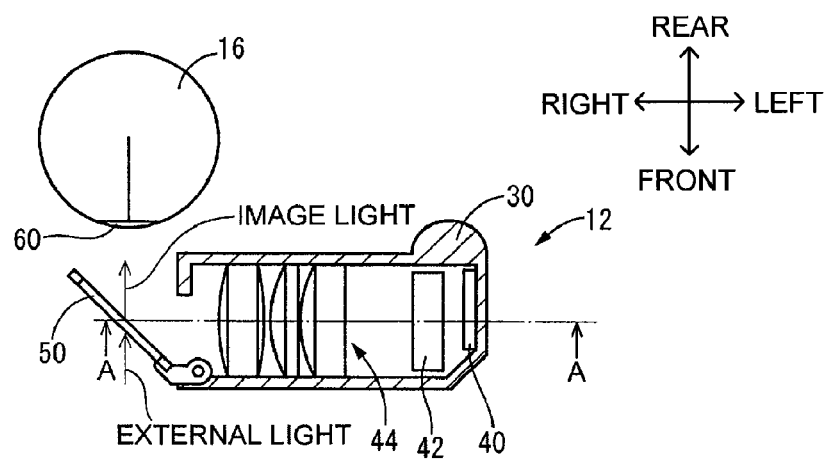
FIG. 2A is a partial sectional plan view showing a hollow housing of the HMD.
Figure 2B:
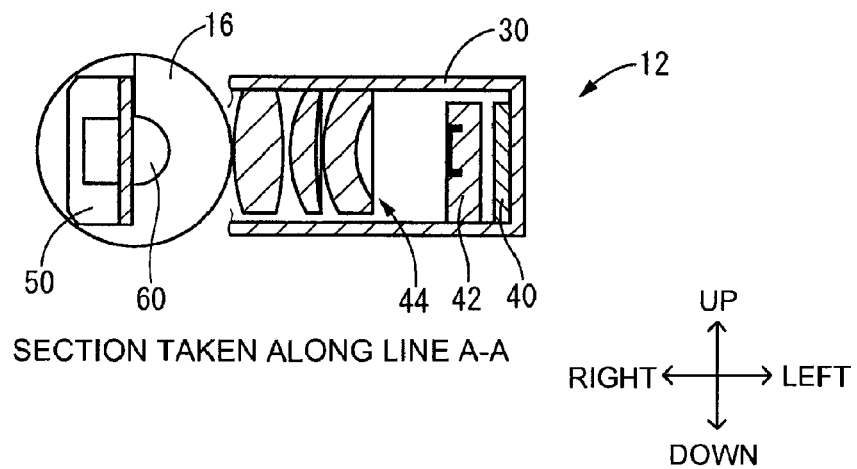
FIG. 2B is a sectional view of the HMD taken along the line A-A in FIG. 2A.

As shown in FIGS. 2A and 2B, a housing 30 of the display 12 may have an outer shape extending linearly. The housing 30 may contain a plate-shaped drive circuit 40, a liquid crystal display ("LCD") 42 (e.g., a display panel), and an ocular optical system 44. The drive circuit 40, the LCD 42, and the ocular optical system 44 may be arranged along a longitudinal direction (e.g., a first direction) of the housing 30. The LCD 42 may comprise a plurality of pixel elements arranged two-dimensionally therein.

The ocular optical system 44 may comprise a plurality of lenses with a common optical axis. The common optical axis of the plurality of lenses may extend in a direction parallel to the longitudinal direction of the housing 30. The common optical axis of the plurality of lenses may pass a center of the LCD 42 without being bent by a part, such as a mirror.

The drive circuit 40 may be electrically connected to the LCD 42 via a cable (not shown). The drive circuit 40 may be configured to drive the LCD 42 based on an image signal received from a device external to the HMD 10. As the LCD 42 is driven, image light representing an image may be emitted from the LCD 42. The LCD 42 may comprise a backlight source. In some configurations, for example, a light source independent of the LCD 42 may be used. The ocular optical system 44 may comprise a plurality of optical components that may comprise, for example, the plurality of lenses arranged in a line. Nevertheless, the plurality of optical components may not be limited to configurations comprising plurality of optical elements (e.g., lenses). For example, the plurality of optical components may comprise an optical element comprising a plurality of integrally formed optical functional surfaces (e.g., a free-form surface prism).

In particular configurations, the display 12 may comprise the LCD 42 as an exemplary display panel. Nevertheless, in some configurations, for example, the display 12 may be a retinal scanning type display, which may be configured to scan a light beam (e.g., a laser), diverging from a light source using a scanner and emit the scanned light beam toward, for example, a retina of the user's eye.

As shown in FIG. 2A, each of the drive circuit 40 and the LCD 42 may have a shape similar to a flat plate (e.g., a flat plate-like shape similar to that depicted in FIGS. 2A and 2B). The drive circuit 40 may be disposed at one end of the housing 30 in the longitudinal direction. In particular configurations, for example, the drive circuit 40 may be disposed closer to a left end of the housing 30 than the LCD 42 and the ocular optical system 44, as shown in FIG. 2A. Facing surfaces of the drive circuit 40 and the LCD 42 may be disposed in parallel with each other, for example.

The image light may be emitted from the other end of the housing 30 in the longitudinal direction (e.g., a right end of the housing 30 in FIG. 2A). The other end of the housing 30 may be an end of the housing in the longitudinal direction at which the drive circuit 40 may be disposed. The display 12 may comprise a semitransparent mirror 50, for example, which may be an example of a deflector. The semitransparent mirror 50 may be configured to deflect the image light emitted from the housing 30 and direct the image light to the light receiver (e.g., the observing eye 16 of the user). The semitransparent mirror 50 may be pivotably disposed at the other end of the housing 30, which may be the end of the housing 30 opposite to the one end at which the drive circuit 54 may be disposed. As shown in FIG. 2A, for example the semitransparent mirror 50 may be in a direct line of sight of a pupil 60 of the observing eye 16.

The image light deflected by the semitransparent mirror 50 may, for example, enter a retina (not depicted) of the user's eye through a pupil 60 of the observing eye 16. Thus, the user may observe a two-dimensional image as a virtual image. In some configurations, external light (e.g., light from the environment external to the HMD 10), also may enter the observing eye 16 in addition to the image light deflected by the semitransparent mirror 50. Thus, the user may observe an image represented by the image light superimposed on the user's view of the environment external to the HMD 10. Consequently, the semitransparent mirror 50 may act as a combiner.

As shown in FIGS. 1, 3A, and 3B, the frame 20 may comprise a front portion 70 at a front end thereof. The front portion 70 may extend between a left vertical plane and a right vertical plane. For example, the left vertical plane may be a vertical plane that may intersect the left ear of the user and extend in contact with a left surface of the head of the user when the user is wearing the HMD 10, and the right vertical plane may be a vertical plane that may intersect the right ear of the user and extend in contact with a right surface of the head of the user when the user is wearing the HMD 10. In particular configurations, for example, the holder 14 may be attached to the front part 70.

Figure 4:
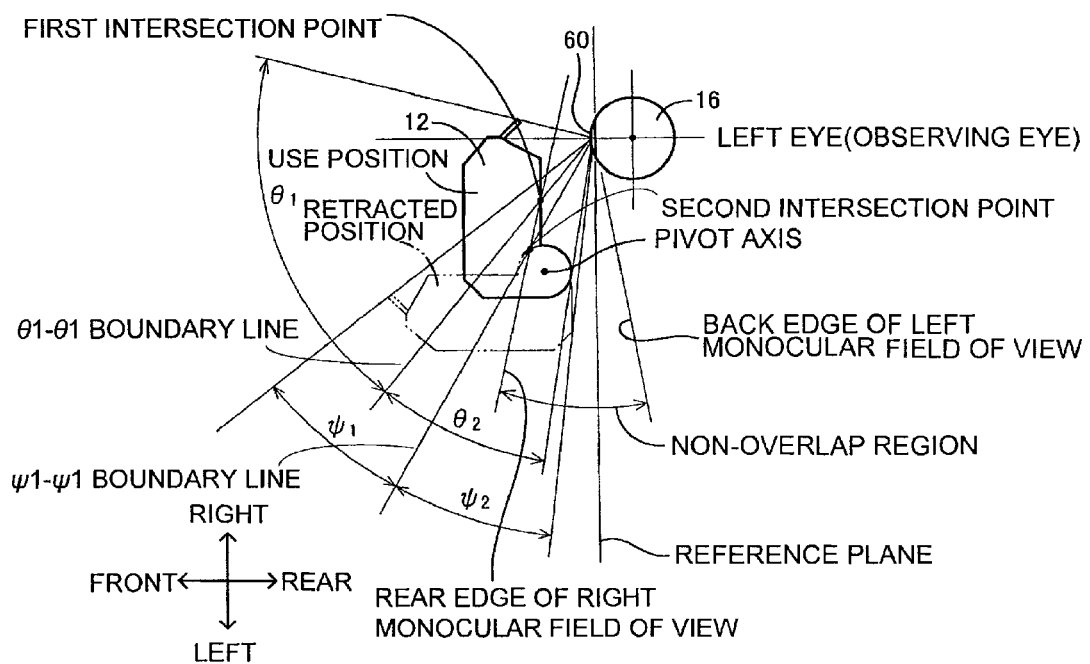
FIG. 4 is a plan view showing relative positions of the HMD with respect to a range of visual angles (e.g., a field of view) of a light receiver (e.g., a user's eye).

In particular, the holder 14 may be configured to retain the display 12, via the connector 14a. in a manner that may enable the display 12 to pivot about the pivot axis shown in FIGS. 1, 3A, and 3B. In particular configurations, for example, the pivot axis may pass through the center of the connector 14a and may coincide with a vertical axis at the end of the front portion 70 that may be located closer to the observing eye 16. Moreover, as shown in FIGS. 3A, 3B, and 4, the holder 14 may be configured to retain the display 12 in a manner that may enable the display 12 to pivot about the vertical pivot axis between a "use position" (e.g., a first position, an operational position) and a "retracted position" (e.g., a second position). The use position may correspond to a position in front of the observing eye 16. The retracted position may correspond to a position that may be different from the use position and may be retracted from the position in front of the observing eye 16. When the HMD 10 is in an operational state, for example, the display 12 may be pivoted to the use position, and the display 12 may emit image light toward the observing eye 16. When the HMD 10 is in a state other than the operational state (e.g., a non-operational state), for example, the display 12 may be pivoted to the refracted position so that the display 12 does not impede the vision of the observing eye 16. In addition, the display 12 may be pivoted to the retracted position when the HMD 10 is in the operational state, and the display 12 may be pivoted to the use state when the HMD 10 is in a state other than the operational state.

In particular configurations described above, the display 12 may be engaged with the frame 20 such that at least a portion of the display 12 may be disposed closer to the user than the frame 20 in the front-rear direction when the user wears the HMD 10. As shown in FIG. 3A, in some configurations, the display 12 may be positioned closer to the user than an intermediate portion of the front portion 70. Consequently, the display 12 may be located closer to the observing eye 16 than the intermediate portion of the front portion 70. The display 12 may be a see-through type display, for example. Therefore, the semitransparent mirror 50 may be disposed in front of the observing eye 16.

When the display 12 is positioned as described above, a substantial area of the field of view of the observing eye 16 may be covered by the display 12. As a result, the user may become sensitive and feel discomfort or stress caused by the display 12 when the user wears the HMD 10. As used herein, a field of view of a light receiver, such as the observing eye 16, may be, for example, the extent of the environment external to the light receiver that may be visible to the light receiver. For example, the field of view of the left eye depicted in FIG. 3A comprises the region spanning from the back edge of left monocular view identified on the left side of the left eye to the back edge of left monocular view identified on the right side of the left eye. Surfaces (e.g., areas) disposed within an unimpeded (e.g., not blocked by an opaque object) line of sight of the light receiver (e.g., the observing eye 16), for example, may be considered within the field of view of the light receiver. Nevertheless, surfaces that are not within an unimpeded line of sight of the light receiver (e.g., surfaces blocked by an opaque object, such as a surface of the display 12 farthest from the observing eye 16 in the front direction shown in FIG. 3A) may not be considered within the field of view of the light receiver.

The inventors conducted an experiment based on a relationship between the position and orientation of the display 12 with respect to the observing eye 16 and a degree of discomfort and stress experienced by the user when the user wears the HMD 10. As a result of the experiment, the inventors found four conditions that, when satisfied, reduce discomfort and stress experienced by the user.

In the experiment, the inventors determined that a first condition, which reduces discomfort and stress experienced by the user, occurs when a whole body of the display 12 is present in an area in front of a first reference plane in the front direction when the user wears the HMD 10. The first reference plane may be a plane extending in the vertical direction while intersecting the pupils 60 of both eyes of the user, as shown in FIG. 3A. As described herein, the vertical direction may be defined in a coordinate system with respect to the HMD 10, rather than in an absolute coordinate system. Therefore, when a facing orientation of the HMD 10 is changed (e.g., when a facing orientation of the head of the user who wears the HMD 10 is changed), the vertical direction with respect to the direction of gravity may be changed. Consequently, the vertical direction may correspond to the up-down direction. When the user wearing the HMD 10 faces the front in an upright position, generally, the vertical direction may coincide with the direction of gravity.

In the experiment, the inventors determined that a second condition, which reduces discomfort and stress experienced by the user, occurs when a rear edge of the monocular field of view of one of the right and left eyes in a horizontal direction (e.g., a front-rear direction in FIG. 3A) coincides with a rear edge of a peripheral field of view of the one of the right and left eyes when the user wears the HMD 10, as shown in FIG. 3A. The inventors determined that, when the second condition is satisfied in both the observing eye 16 and the non-observing eye 18, the discomfort and stress experienced by the user is reduced significantly. The rear edge of the monocular field of view may refer to a rear edge of a visible range of one eye of the user. When there is no obstruction in the field of view of the one eye of the user, the rear edge of the monocular field of view may coincide with a rear edge of the peripheral field of view. Nevertheless, the user's head comprises a nose, and the rear edge of the monocular field of view of at least one of the right and left eyes may be limited by a position and height of the nose. In particular, a left rear edge of the monocular field of view of the right eye may be limited by the position and height of the nose, and a right rear edge of the monocular field of view of the left eye may be limited by the position and height of the nose. Thus, the second condition may be satisfied when the display 12 is disposed at a position that is on an opposite side of the nose where the display 12 may not obstruct the peripheral field of view of one of the user's eyes. Accordingly, the rear edge of the monocular field of view may be position shifted (e.g., shifted 100 degrees from a center line extending in the front-rear direction and intersecting through an eyeball of one eye in the user's eye). As described herein, the horizontal direction may be defined in a coordinate system with respect to the HMD 10, rather than in an absolute coordinate system. Therefore, when a facing orientation of the HMD 10 is changed (e.g., when a facing orientation of the head of the user who wears the HMD 10 is changed), the horizontal direction with respect to the direction of gravity may be changed. Thus, the horizontal direction may correspond to the right-left direction. When the user wearing the HMD 10 faces the front in an upright position, generally, the horizontal direction may extend perpendicular to the direction of gravity. As shown in FIG. 3B, a vertical monocular field of view of each of the observing eye 16 and the non-observing eye 18 may be position shifted (e.g., shifted 67.5 degrees from the center line extending in the front-rear direction and intersecting through the eyeball of one eye in the user's eye).

As shown in FIG. 3A, the field of view of the observing eye 16 may comprise an overlap region that may overlap the field of view of the non-observing eye 18 and a non-overlap region that may not overlap the field of view of the non-observing eye 18. Consequently, the second condition may occur when a first projected area of the display 12 is greater than a second projected area of the display 12. The first projected area may be an area of one surface of the display 12 that is in the overlap region. The second projected area may be another area of the one surface of the display 12 that is in the non-overlap region. The one surface of the display 12 may be a surface opposing the user when the user is wearing the HMD 10. According to the research carried by the inventors, the discomfort and stress experienced by the user may be reduced significantly when the first and second conditions are satisfied simultaneously when the user is wearing the HMD 10.

In the experiment, the inventors determined that a third condition, which reduces discomfort and stress experienced by the user, occurs when the display 12 is retained closer to an ear on the side of the user comprising the observing eye 16 (e.g., the observing eye side) than to the vertical plane extending in the front-rear direction and intersecting the pupil 60 of the observing eye 16 when the user wears the HMD 10. In the third condition, the whole body of the display 12 may, in some configurations, not be located closer to the ear on the observing eye side than to the vertical plane. For example, the discomfort and stress experienced by the user may be reduced when the housing 30, except the semitransparent mirror 50 and a holder member of the semitransparent mirror 50, of the display 12 is positioned closer to the ear on the observing eye side than to the vertical plane. According to the research carried by the inventors, the discomfort and stress experienced by the user may be reduced significantly when the third condition is satisfied simultaneously with at least one of the first and second conditions while maintaining the user's field of view.

The third condition may be an important condition to maintain the user's field of view because the display 12 may be disposed outside of a central field of view of the observing eye 16. The central field of view may be a range in which the user has a clearer view of the external environment.

In the experiment, the inventors determined that a fourth condition, which reduces discomfort and stress experienced by the user, occurs when at least one of the first, second, and third conditions is satisfied and the display 12 is positioned in each of the use position and the retracted position. According to the research carried by the inventors, discomfort and stress experienced by the user may be reduced significantly when the fourth condition is satisfied.

In particular configurations, a position and orientation of the display 12 may be determined relative to the position of the observing eye 16 that may satisfy the above-described four conditions simultaneously and reduce the discomfort and stress experienced by the user. The holder 14 may be attached to the frame 20 such that the display 12 may be retained at the position where the display 12 may satisfy the relative positional relationship described above.

For example, as shown in FIG. 3A, the holder 14 may be configured to retain the whole body of the display 12 in front of the first reference plane, regardless of whether the display 12 is in the use position or the retracted position (e.g., the first condition). In such configurations, portions of the display 12 may not be located behind the reference plane in the rear direction.

As shown in FIG. 4, for example, the holder 14 may retain the display 12 in a position in which a first visual angle $\theta 1$ may be greater than or equal to a second visual angle $\theta 2$. The first visual angle $\theta 1$ may be a visual angle of the observing eye 16 when the user views, using the observing eye 16, an area existing within the overlap region through the display 12 in the use position when wearing the HMD 10. The second visual angle $\theta 2$ may be a visual angle of the observing eye 16 when the user views, using the observing eye 16, an area existing within the non-overlap region through the display 12 in the use position when wearing the HMD 10. In particular configurations, for example, the display 12 may have substantially the same height in the up-down direction at each position of the display 12 in the longitudinal direction. Therefore, the condition in which the first visual angle $\theta 1$ is greater than or equal to the second visual angle $\theta 2$ may be substantially equivalent to the second condition described above.

In FIG. 4, a boundary between the first visual angle $\theta 1$ and the second visual angle $\theta 2$ may be represented by a $\theta 1$-$\theta 2$ boundary line from the left eye that passes through a first intersection point at which a line forming a boundary between the overlap region and the non-overlap region intersects an outer surface of the housing 30 of the display 12 when the display 12 is in the use position. The $\theta 1$-$\theta 2$ boundary line may be indicated by a solid line in FIG. 4. In particular configurations, for example, the boundary between the overlap region and the non-overlap region may coincide with the rear edge of the monocular field of view of the right eye of the user.

The holder 14 may retain the display 12 in a position in which a first visual angle $\psi 1$ may be greater than or equal to a second visual angle $\psi 2$. The first visual angle $\psi 1$ may be a visual angle of the observing eye 16 when the user views, using the observing eye 16, an area existing within the overlap region through the display in the retracted position when wearing the HMD 10. The second visual angle $\psi 2$ may be a visual angle of the observing eye 16 when the user views, using the observing eye 16, an area existing within the non-overlap region through the display in the retracted position when wearing the HMD 10. In particular configurations, for example, the condition in which the first visual angle $\psi 1$ is greater than or equal to the second visual angle $\psi 2$ may be substantially equivalent to the second condition described above.

In FIG. 4, a boundary between the first visual angle $\psi 1$ and the second visual angle $\psi 2$ may be represented by a $\psi 1$-$\psi 2$ boundary line from the left eye that passes through a second intersection point at which a line forming a boundary between the overlap region and the non-overlap region intersects an outer surface of the housing 30 of the display 12 when the display 12 is in the retracted position. The $\psi 1$-$\psi 2$ boundary line may be indicated by a solid line in FIG. 4.

Further, as shown in FIG. 1, the holder 14 may retain the display 12 closer to the ear on the observing eye side (e.g., the left ear) than to the vertical plane, which extends in the front-rear direction and intersects the pupil 60 of the observing eye 16, when the user wears the HMD 10 (e.g., the third condition).

Furthermore, as shown FIG. 1, the holder 14 may retain the display 12 such that the longitudinal direction of the display 12 may coincide with the horizontal direction, regardless of whether the display 12 is located in the use position or in the retracted position. Moreover, the holder 14 may retain the display 12 such that the display 12 may extend along the horizontal plane on the horizontal plane intersecting the pupil 60 of the observing eye 16.

As described above, the appropriate placement and orientation of the display 12 relative to the observing eye 16 may reduce discomfort and stress experienced by the user caused by the display 12 when the user wears the HMD 10 on the user's head.

While the invention has been described in connection with various exemplary structures and illustrative configurations, it will be understood by those skilled in the art that other variations and modifications of the structures, configurations, and embodiments disclosed above may be made without departing from the scope of the invention. For example, this application comprises each and every possible combination of the various elements and features disclosed and incorporated by reference herein, and the particular elements and features presented in the claims and disclosed and incorporated by reference above may be combined with each other in each and every possible way within the scope of the application, such that the application should be recognized as also directed to other embodiments comprising other possible combinations. Other structures, configurations, and embodiments consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. A wearable display for mounting on a supporting structure including a first light receiver and a second light receiver separated from the first light receiver along a first direction, the first light receiver having a first field of view, the second light receiver having a second field of view, the first light receiver and the second light receiver having an overlap region where the first field of view is coextensive with the second field of view, and the wearable display comprising:
    a display configured to emit image light toward the first light receiver when the wearable display is in an operational state and mounted on the supporting structure; and
    a holder configured to retain the display in a first position relative to the first light receiver when the wearable display is in the operational state and mounted on the supporting structure,
    wherein a first area of the display and a second area of the display are configured to be the only areas of the display that face the first light receiver when the display is in the first position and the wearable display is mounted on the supporting structure,
    wherein the first area of the display and the second area of the display are configured to be within the first field of view when the display is in the first position and the wearable display is mounted on the supporting structure,
    wherein the first area is configured to be the only area in the overlap region when the display is in the first position and the wearable display is mounted on the supporting structure,
    wherein the first area is greater than the second area,
    wherein the display is configured to be fixed at a position that is closer in the first direction to a point where the wearable display mounts to the supporting structure than to the first light receiver and the second light receiver when the wearable display is mounted on the supporting structure, and
    wherein the display is configured to be separated from the first light receiver and the second light receiver in a second direction that is perpendicular to the first direction when the wearable display is mounted on the supporting structure.

2. The wearable display according to claim 1,
wherein the holder is configured to attach to a support member configured to mount on the supporting structure, such that the support member is fixed relative to the first light receiver, and
wherein the holder is configured to retain at least a portion of the display nearer to the first light receiver than the support member when the holder retains the display in the first position and the support member is fixed relative to the first light receiver.

3. The wearable display according to claim 1,
wherein the display comprises a housing,
wherein the holder is configured to attach to a support member configured to mount on the supporting structure, such that the support member is fixed relative to the first light receiver, and
wherein the housing is configured to extend in the first direction when the holder is attached to the support member fixed relative to the first light receiver.

4. The wearable display according to claim 1,
wherein the display comprises a housing,
wherein the holder is configured to attach to a support member configured to mount on the supporting structure, such that the support member is fixed relative to the first light receiver, and
wherein the housing is configured to extend in a direction skew to a reference plane that extends in the first direction and intersects the first light receiver and the second light receiver when the holder is attached to the support member fixed relative to the first light receiver.

5. The wearable display according to claim 1,
wherein the display comprises a housing,
wherein the holder is configured to attach to a support member configured to mount on the supporting structure, such that the support member is fixed relative to the first light receiver, and
wherein the housing is configured to extend in the first direction along a reference plane that intersects the first light receiver and the second light receiver when the holder is attached to the support member fixed relative to the first light receiver.

6. The wearable display according to claim 1,
wherein the holder is configured to attach to a support member configured to mount on the supporting structure, such that the support member is fixed relative to the first light receiver and the second light receiver, and
wherein the holder is further configured to retain the display on a first side of the first light receiver, which is opposite to a second side of the first light receiver that is closer than the first side to the second light receiver, when the holder is attached to the support member fixed relative to the first light receiver.

7. The wearable display according to claim 1, wherein the display further comprises a housing, the housing comprising:
    a display panel configured to generate the image light;
    a plurality of optical portions configured to pass the image light therethrough; and
    a drive circuit configured to drive the display panel,
    wherein the display panel, the plurality of optical portions, and the drive circuit are arranged within the housing along a particular direction.

8. The wearable display according to claim 7,
wherein each of the drive circuit and the display panel has a flat plate-like shape,
wherein the drive circuit is disposed closer to one end of the housing along the particular direction than the display panel and the plurality of optical portions, and
wherein the drive circuit faces the display panel.

9. The wearable display according to claim 8, wherein the display further comprises a light deflector disposed at another end of the housing and configured to deflect the image light emitted to the first light receiver.

10. The wearable display according to claim 9,
wherein the light deflector is a semitransparent combiner configured to deflect the image light and to allow external light to pass therethrough, and
wherein the semitransparent combiner is configured to direct the image light and the external light toward the first light receiver when the holder retains the display in the first position and the wearable display is mounted on the supporting structure.

11. The wearable display according to claim 10, wherein the semitransparent combiner is configured to be disposed in a direct line of sight of the first light receiver when the holder retains the display in the first position and the wearable display is mounted on the supporting structure.

12. The wearable display according to claim 1,
wherein the holder is configured to retain the display in a second position relative to the first light receiver when the wearable display is in another state other than the operational state and mounted on the supporting structure,
wherein the holder is configured to pivot the display between the first position and the second position when the display is changed from the first position to the second position,
wherein a third area of the display and a fourth area of the display are configured to be the only areas of the display that face the first light receiver when the display is in the second position and the wearable display is mounted on the supporting structure,
wherein the third area of the display and the fourth area of the display are configured to be within the first field of view when the display is in the second position and the wearable display is mounted on the supporting structure,
wherein the third area is configured to be the only area of the third area and the fourth area in the overlap region when the display is in the second position and the wearable display is mounted on the supporting structure, and
wherein the third area is greater than the fourth area.

13. The wearable display according to claim 12, wherein at least a portion of the third area is the same as at least a portion of the first area.

14. The wearable display according to claim 12,
wherein the holder is configured to attach to a support member configured to mount on the supporting structure, such that the support member is fixed relative to the first light receiver and the second light receiver,
wherein the holder is configured to retain the display at a pivot axis intersecting a first end of a front portion of the support member, and
wherein the first end of the front portion of the support member is disposed nearer to the first light receiver than a second end of the front portion of the support member, which is opposite to the first end and nearer to the second light receiver, when the holder is attached to the support member fixed relative to the first light receiver.

15. The wearable display according to claim 12,
wherein the holder is configured to attach to a support member configured to mount on the supporting structure, such that the support member is fixed relative to the light receiver,
wherein the holder is further configured to pivot the display between the first position and the second position by pivoting the display about a pivot axis, and
wherein the pivot axis extends in a direction orthogonal to a reference plane that extends in the first direction and intersects the first light receiver, the second light receiver, and the holder when the holder is attached to the support member fixed relative to the first light receiver.

16. A wearable display for mounting on a supporting structure including a first light receiver and a second light receiver separated from the first light receiver along a first direction, the first light receiver having a first field of view, the second light receiver having a second field of view, the first light receiver and the second light receiver having an overlap region where the first field of view is coextensive with the second field of view, and the wearable display comprising:
a display configured to emit image light toward the first light receiver when the wearable display is in an operational state and mounted on the supporting structure; and
a holder configured to retain the display in a first position relative to the first light receiver when the wearable display is in the operational state and mounted on the supporting structure,
wherein a first area of the display and a second area of the display are configured to be the only areas of the display that face the first light receiver when the display is in the first position and the wearable display is mounted on the supporting structure,
wherein the first area of the display and the second area of the display are configured to be within the first field of view when the display is in the first position and the wearable display is mounted on the supporting structure,
wherein the first area is configured to be the only area in the overlap region when the display is in the first position and the wearable display is mounted on the supporting structure,
wherein a first reference plane extends from the first light receiver through an end boundary of the first area farthest in the first direction from the second area,
wherein a second reference plane extends from the first light receiver through an end boundary of the first area nearest in the first direction to the second area,
wherein a third reference plane extends from the first light receiver through an end boundary of the second area farthest in the first direction from the first area,
wherein the first reference plane and the second reference plane intersect to form a first visual angle $\theta 1$,
wherein the second reference plane and the third reference plane intersect to form a second visual angle $\theta 2$ and
wherein the first visual angle $\theta 1$ is greater than the second visual angle $\theta 2$.

17. The wearable display according to claim 16,
wherein the holder is configured to retain the display in a second position relative to the first light receiver when the wearable display is in another state other than the operational state and mounted on the supporting structure,
wherein the holder is configured to pivot the display between the first position and the second position when the display is changed from the first position to the second position, wherein a third area of the display and a fourth area of the display are configured to be the only areas of the display that face the first light receiver when the display is in the second position and the wearable display is mounted on the supporting structure, wherein the third area of the display and the fourth area of the display are configured to be within the first field of view when the display is in the second position and the wearable display is mounted on the supporting structure, wherein the third area is configured to be the only area of the third area and the fourth area in the overlap region when the display is in the second position and the wearable display is mounted on the supporting structure, wherein a fourth reference plane extends from the first light receiver through an end boundary of the third area farthest in the first direction from the fourth area, wherein a fifth reference plane extends from the first light receiver through an end boundary of the third area nearest in the first direction to the fourth area, wherein a sixth reference plane extends from the first light receiver through an end boundary of the fourth area farthest in the first direction from the third area, wherein the fourth reference plane and the fifth reference plane intersect to form a third visual angle $\psi 1$, wherein the fifth reference plane and the sixth reference plane intersect to form a fourth visual angle $\psi 2$, and wherein the third visual angle $\psi 1$ is greater than the fourth visual angle $\psi 2$.

* * * * *